United States Patent Office — 3,761,452, Patented Sept. 25, 1973

3,761,452
EPOXY POLYURETHANE PREPOLYMER COMPOSITIONS WHICH ARE SELF-CURING UPON APPLICATION OF HEAT
Robert Louis Dawson, Newark, Del., assignor to E. I. du Pont de Nemours and Company, Wilmington, Del.
No Drawing. Filed Feb. 16, 1968, Ser. No. 705,895
Int. Cl. C08g 22/16
U.S. Cl. 260—77.5 AP    12 Claims

ABSTRACT OF THE DISCLOSURE

A heat curable polyurethane prepolymer prepared by reacting (A) a polyol, (B) an excess of an organic polyisocyanate, and (C) about $$\frac{B-A}{2}$$

equivalents of a 2,3-epoxyalcohol wherein B and A represent the number of equivalents of the B and A components used. Cured polyurethanes prepared by heating the aforementioned prepolymers are also disclosed.

BACKGROUND OF THE INVENTION

Polyurethane compositions obtained by curing isocyanato-terminated prepolymers, usually by adding diamines or polyols, are finding increased use in diverse applications such as castable elastomers, adhesives and sealing compositions.

For many purposes it is highly desirable to have a one-component polyurethane prepolymer which is stable at room temperature for extended periods but which can be readily cured, by heating, to a useful polymeric material. Such prepolymers have important advantages in ease and convenience of handling, since the additional step of incorporating a curing agent is eliminated. The one-component prepolymers also avoid difficulties caused by the limited "pot life" of systems in which a curing agent is added just before use. Such problems, for example, are the need to process the material while it is still in workable condition and possible wastage of material because of premature solidification.

It has been proposed that heat-curable prepolymers of the type described above be prepared by blocking both ends of an isocyanato-terminated polyurethane with a blocking agent which can be removed by heating. Although a very large number of compounds have been examined as blocking agents for isocyanates, only phenol and methyl ethyl ketoxime have achieved even modest practical importance. The use of these compounds is limited to applications in which the blocking agent can be readily removed by volatilization since otherwise the liberated blocking agent causes bubble formation in the cured polymer. The bubble formation problem becomes more acute in cast polyurethanes as the thickness of the cast section increases. In addition, removal of the liberated blocking agents is wasteful of materials.

A need exists, therefore, for a one-component polyurethane prepolymer that is stable at room temperature for extended periods and can be readily cured by heating to a useful polyurethane, but which does not require removal of a blocking agent during the curing step.

SUMMARY OF THE INVENTION

According to this invention a one-component polyurethane prepolymer which is self-curing upon applying heat is prepared by reacting:

(A) One equivalent of at least one polyol containing two or more isocyanate-reactive hydroxy groups;

(B) At least about 1.2 equivalents per equivalent of polyol of an organic polyisocyanate; and (C) Approximately $$\frac{B-A}{2}$$

equivalents of a 2,3-epoxyalcohol, of the formula:

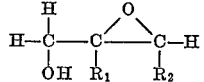

wherein $R_1$ and $R_2$ are independently hydrogen or $C_1$–$C_4$ alkyl, and B and A represent the number of equivalents, respectively, of the polyisocyanate and polyol components. The invention also includes the cured polyurethane product resulting from heating the aforementioned prepolymer.

The stoichiometry and equivalents of materials indicated herein are based solely on the reaction of hydroxy groups with isocyanato groups to prepare the compositions of this invention and assume, as is well accepted in the art, that one free hydroxy group reacts with one free isocyanato group.

DETAILED DESCRIPTION

A wide variety of compounds containing at least two isocyanate-reactive hydroxy groups can be used in this invention, depending on the physical and chemical properties desired in the cured product. It is generally preferred to use at least one hydroxy-containing component having a relatively high molecular weight, i.e., above about 350, in order that the final cured product have satisfactory physical properties. The upper limit of the molecular weight of the hydroxy-containing component is not critical and can be as high as 10,000. The preferred polyhydroxy compounds have molecular weights from about 350–3000 because of their availability and the high quality polyurethanes prepared from them. Examples of suitable types of such relatively high molecular weight polyhydroxy components include hydroxy-terminated polyethers, polythioethers, polyesters or polyester-amides.

Representative hydroxy-terminated polyethers useful in this invention include polyalkyleneether polyols prepared by polymerization or copolymerization of cyclic ethers such as ethylene oxide, propylene oxide, trimethylene oxide, and tetrahydrofuran, or by the polymerization or copolymerization of one of these cyclic ethers in the presence of polyhydric alcohols such as alkanediols or aliphatic polyols, such as ethylene glycol, propylene glycol, 1,3-butanediol, glycerol, 2-ethyl-2-(hydroxymethyl)-1,3-propanediol (commonly called trimethylolpropane) or sorbitol. The polyether chain can contain arylene radicals. It is preferred that the polyol component of this invention contain about 25–75 mole percent of such polyalkyleneether polyols.

Examples of suitable hydroxy-terminated polythioethers are represented by the formula $HO(GY)_xH$ wherein G represents hydrocarbon radicals, at least some of which are alkylene, Y represents chalcogen atoms, some of which are sulfur, and the rest are oxygen, and $x$ is an integer sufficiently large to give the desired molecular weight. These glycols can be prepared, for example, by condensing together various glycols and 2,2'-thiodiethanol in the presence of a catalyst such as p-toluenesulfonic acid.

Polyesters which are especially suitable for use in practicing this invention are the hydroxy-terminated polyesters prepared from dicarboxylic acids and aliphatic dihydroxy compounds. Representative examples of dicarboxylic acids which can be used include succinic acid, glutaric acid, adipic acid and benzenedicarboxylic acids. Examples of suitable hydroxy compounds are ethylene glycol, propylene glycol, 1,3-butanediol, 1,4-butanediol, and 1,6-hexanediol. Polyesters having more than two hydroxy groups can be prepared similarly by using one or more reactants having more than two functional groups.

The polyester amides are prepared by reacting any of the representative polycarboxylic acids mentioned above with an aminoalcohol, such as aminoethanol or aminopropanol.

For a detailed discussion of the above types and additional examples of polyhydroxy compounds which can be used in this invention, see U.S. Pat. 3,248,373 to Barringer, cols. 4–6.

It is also possible to employ as at least a part of the polyhydroxy component an aliphatic polyol having a relatively low molecular weight, that is, less than about 350. These low molecular weight polyols can be mixed with the high molecular weight polyols described above to impart predetermined properties to the final polyurethanes. The proportions of each component to be used in preparing a polyurethane with particular properties can easily be determined by one skilled in the art. In general, the greater the proportion of low molecular weight polyol present, the harder will be the final cured product. Representative low molecular weight polyols include ethylene glycol, propylene glycol, 1,3-butanediol, trimethylolpropane and glycerol. Other examples are listed in columns 5 and 6 of U.S. Pat. 3,248,373 to Barringer.

The isocyanates used in practicing this invention can be aliphatic, cycloaliphatic, or aromatic in nature. Examples of suitable isocyanates include 2,4-tolylene diisocyanate, 2,6-tolylene diisocyanate, 1,5-naphthylene diisocyanate, 4,4'-methylenebis(phenyl isocyanate), 4,4'-methylenebis(cyclohexyl isocyanate), 1,6-hexamethylene diisocyanate, 4,4',4''-methylidinetris(phenyl isocyanate), and O,O,O-tris(isocyanatophenyl)thiophosphate. Mixtures of these isocyanates can also be used.

Undistilled crude or partly refined polyisocyanates that result from the phosgenation of the corresponding polyamine can also be used, frequently with considerable economic advantage. Such crude polyisocyanates usually contain a certain amount of condensation products with biuret and urea structures formed during the preparation of the isocyanates which are not removed following phosgenation. These isocyanate mixtures often have an isocyanato functionality greater than two due to the presence of some tri- and higher functional amines in the diamine which is phosgenated.

The preferred isocyanates are the aromatic polyisocyanates since they cure rapidly to give harder and generally more useful polyurethane products. The tolylene diisocyanates, especially the readily available mixtures containing 65–80% 2,4-tolylene diisocyanate and 35–20% 2,6-tolylene diisocyanate, and 4,4'-methylenebis(phenyl isocyanate) are particularly preferred because of their availability and the generally improved products obtained from them.

It is generally preferred to use a predominant amount of difunctional isocyanates and polyol in order to prevent premature cross-linking of the composition. However, for many applications, such as where harder and more insoluble polyurethane products are desired, material having more than two functional groups is desirable. Such variations will be within the scope of those skilled in the art.

The 2,3-epoxyalkanols used in this invention correspond to the formula:

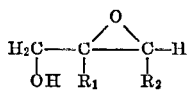

wherein $R_1$ and $R_2$ are independently hydrogen or $C_1$–$C_4$ alkyl. The preferred 2,3-epoxyalkanol is glycidol (2,3-epoxy-1-propanol) because of its ready availability and high reactivity. However, satisfactory results can be achieved by using any of the epoxyalkanols corresponding to the above formula.

The stoichiometric ratio of isocyanate component to hydroxy component to be used in practicing this invention can range from about 1.2–12 equivalents of isocyanate compound per equivalent of polyhydroxy compound (not including the epoxy alcohol). At least about 1.2 equivalents of the isocyanate should be used in order to provide a sufficient excess of isocyanato groups to react with the hydroxy group of the epoxy alcohol. Properties such as hardness of the final cured product can be varied by using higher stoichiometric ratios of isocyanate to hydroxy compound. The preferred range for most applications is from about 1.5–8 because of the generally superior properties of the resulting polyurethanes.

The amount of epoxyalkanol compound to be used in preparing the products of this invention is approximately the amount sufficient to react with half of the free isocyanato groups remaining after the isocyanato groups have reacted with the polyfunctional hydroxy-containing reactants. It is to be understood that the number of equivalents of epoxy alkanol can vary from one-half the excess isocyanato group equivalents present by about ±15% and the expression "approximately $$\frac{B-A}{2}$$

equivalents" used in the "summary of the invention" and claims to represent the quantity of epoxyalkanol employed should be so construed.

In preparing the polyurethane compositions of this invention, standard techniques are used. In the simplest and most preferred procedure, the various ingredients are mixed and allowed to react. The reaction rate is increased by heating, but temperatures above about 90° C. should preferably not be used in order to avoid opening the ring of the epoxy component. The preferred reaction temperature is about 70–90° C. Alternatively, the epoxy compound can be reacted after the isocyanato-terminated prepolymer has been prepared. If desired, the product can be prepared in an inert solvent, such as ethyl acetate, methyl ethyl ketone, tetrahydrofuran, trichloroethylene, acetone, or butyl acetate.

The epoxy-isocyanato-terminated prepolymers are stable for indefinite periods of time when stored out of contact with moisture. Curing is effected by heating the polymers without the addition of curing agents. The temperature of curing will depend on the reactivity of the isocyanates and epoxy alkanol used in preparing the prepolymers. In general, temperatures of about 100° C. to about 150° C. are used. Heating times of about two to twenty hours should suffice. If desired, the required temperature and time of heating can be decreased by addition of a suitable catalyst, such as 1,4-diazabicyclo[2.2.2]octane(triethylenediamine), pyridine, pyridine-1-oxide, triethylamine, or boron trifluoride etherate (complex between boron trifluoride and ethyl ether). The use of a catalyst is, however, not essential, and the addition of a catalyst will shorten the pot life of the polyurethane composition.

The polyurethane compositions of this invention are particularly useful for casting, as adhesives for various materials such as metal, or for pouring into intricate forms or crevices. They can also be used for numerous other applications, such as coatings and impregnants for fibrous materials. They have the advantage that, during the curing step, the blocking agent is not removed from the system but reacts to form part of the cured polymer. This permits casting of thicker sections of material without bubble formation and without the need for removing the liberated blocking agent. It also means there is no loss of material from the prepolymer stage to the final polyurethane composition. Use of the polyurethane prepolymers of this invention also makes unnecessary the mixing of a separate curing agent with the prepolymer prior to use as must be done with the curing systems of other conventional polyurethane prepolymers. The final polyurethanes prepared by heating the prepolymers of this invention have excellent physical properties about equivalent to high quality polyurethanes cured by polyols in the prior art processes.

The invention will be better understood by reference to the following examples wherein parts and percentages are by weight unless otherwise indicated. The physical properties indicated throughout the examples are measured as follows: Tensile properties—ASTM Method D–412–64T, Durometer A hardness—ASTM Method D–676–59T at 25° C.

EXAMPLE 1

A mixture of the following materials is stirred under a nitrogen atmosphere and heated at 70° C. for 3 hours in a three-necked 500 ml. flask.

|  | Weight | Mole |
|---|---|---|
| Polytetramethylene ether glycol (M.W. 993) | 199.2 | 0.2 |
| 1,3-butanediol | 18.0 | 0.2 |
| Glycidol | 29.6 | 0.4 |
| Tolylene diisocyanate (mixture of 2,4-tolylene diisocyanate and 2,6-tolylene-diisocyanate in a weight ratio of 80/20) | 139.2 | 0.8 |

The resulting fluid prepolymer is degassed by evacuating the flask while hot with a mechanical pump which normally will produce a vacuum of about 0.5 mm. Hg. After releasing the vacuum, portions of the degassed prepolymer are poured into molds and heated overnight at 140° C. in an air oven.

The properties of the resulting elastomers are as follows:

Elongation at break, percent _____ 190
Tensile strength at break, p.s.i. _____ 3250
Durometer A hardness _____ 91

EXAMPLE 2

The various mixtures shown in the table below are treated in the same way as described in Example 1. The table shows the properties of the final cured polymers.

EXAMPLE 3

A mixture having the components shown below is treated as described in Example 1.

|  | Grams | Mole |
|---|---|---|
| Polypropylene glycol of molecular weight 1,000 | 200 | 0.2 |
| 1,3-butanediol | 18 | 0.2 |
| Tolylene diisocyanate (same mixture as in Ex. 1) | 139.2 | 0.8 |
| Glycidol | 29.6 | 0.4 |

The final cured polymer has the following properties:

Elongation at break, percent _____ 150
Tensile strength at break, p.s.i. _____ 2450
Durometer A hardness _____ 92

EXAMPLE 4

In this example the following ingredients are treated as described in Example 1.

|  | Grams | Mole |
|---|---|---|
| Polytetramethylene ether glycol (M.W. 983) | 98.3 | 0.10 |
| 1,3-butanediol | 1.8 | 0.02 |
| Trimethylolpropane | 4.21 | 0.03 |
| 4,4'-methylenebis(phenylisocyanate) | 75.8 | 0.3 |
| Glycidol | 11.2 | 0.15 |

The final cured polymer has the following properties:

Elongation at break, percent _____ 140
Tensile strength at break, p.s.i. _____ 2225
Durometer A hardness _____ 85

EXAMPLE 5

A mixture of the following ingredients is treated as described in Example 1.

|  | Grams | Mole |
|---|---|---|
| Polyester prepared by condensing adipic acid with a mixture of ethylene glycol (70 parts by weight) and propylene glycol (30 parts by weight), M.W. 2,940 | 147.0 | 0.05 |
| 1,3-butanediol | 9.0 | 0.1 |
| Tolylene diisocyanate (same type used in Ex. 1) | 52.2 | 0.3 |
| Glycidol | 11.1 | 0.15 |

The properties of the final cured elastomer are as follows:

Elongation at break, percent _____ 290
Tensile strength at break, p.s.i. _____ 505
Durometer A hardness _____ 61

EXAMPLE 6

A solution of 42.4 g. (0.1 mole) of a condensate of trimethylolpropane and propylene oxide having a molecular weight of about 424 (commercially available as "Pluracol" TP–440 from Wyandotte Chemicals Corp.), 52.2 g. (0.3 mole) of tolylene diisocyanate (same type as used in Example 1), and 11.1 g. (0.15 mole) of glycidol in 100 ml. of ethyl acetate is heated with stirring at 75° C. under a nitrogen atmosphere for 3 hours, and then allowed to stand at room temperature overnight to give a clear, non-viscous solution. Several stainless steel strips, having dimensions 1 x 5 x ⅛ inches, are painted with the solution, and the solvent is allowed to evaporate in air. The steel strips are then clamped together with ½ sq. in. overlap of the prepolymer coatings and heated at 140° C. for 7 hours. The strips are tightly adhered together, a tensile pull of 2580 p.s.i. being required to separate them.

TABLE

|  | A | | B | | C | | D | | E | |
|---|---|---|---|---|---|---|---|---|---|---|
|  | Grams | Mole | Grams | Mole | Grams | Mole | Grams | Mole | Grams | Mole |
| Polytetramethylene ether glycol (M.W. 993) | 91.6 | 0.092 | 99.3 | 0.100 | 99.3 | 0.100 | 99.3 | 0.100 | 99.3 | 0.100 |
| 1,3-butanediol | 4.13 | 0.046 | 4.5 | 0.050 | 0 | 0 | 0 | 0 | 2.70 | 0.030 |
| Trimethylolpropane | 0 | 0 | 6.7 | 0.050 | 3.35 | 0.025 | 5.36 | 0.040 | 4.02 | 0.030 |
| Tolylene diisocyanate (same as in Example 1) | 48 | 0.276 | 62.6 | 0.360 | 38.3 | 0.220 | 69.6 | 0.400 | 48.7 | 0.280 |
| Glycidol | 10.2 | 0.138 | 10 | 0.135 | 6.1 | 0.083 | 17.75 | 0.240 | 7.0 | 0.095 |
| Elongation at break, percent | 190 | | 140 | | 180 | | 120 | | 190 | |
| Tensile strength at break, p.s.i. | 1,765 | | 2,500 | | 600 | | 1,875 | | 1,750 | |
| Durometer A hardness | 83 | | 92 | | 61 | | 91 | | 77 | |

EXAMPLE 7

The following mixture is stirred under nitrogen and heated at 70° C. for 3 hours in a 250-ml., 3-necked glass flask, then allowed to stand overnight at room temperature.

|  | Grams | Mole |
|---|---|---|
| Polytetramethylene ether glycol (M.W. 993) | 139.1 | 0.14 |
| Glycidol | 9.88 | 0.134 |
| Tolylene diisocyanate (same type as in Ex. 1) | 48.7 | 0.28 |

The resulting prepolymer is reheated to 75° C. and degassed. Samples of the prepolymer are poured into polytetrafluoroethylene molds and cured overnight at 140° C. in an air oven. The cured product is a soft elastomer (Durometer A hardness of 50). The remaining uncured prepolymer is stored in a closed bottle under a nitrogen atmosphere and is still fluid after a period of more than a year.

EXAMPLE 8

A mixture of the following ingredients is heated in a nitrogen atmosphere for 5 hours at 80° C.

| | Grams | Mole |
|---|---|---|
| Polytetramethylene ether glycol (M.W. 983) | 196.6 | 0.2 |
| 1,3-butanediol | 18 | 0.2 |
| 4,4'-methylenebis(cyclohexylisocyanate) (20% trans-trans isomer) | 209.6 | 0.8 |
| Glycidol | 29.6 | 0.4 |

When the product is cured overnight at 140° C., a soft, cured elastomer results. A sample cured for 2 days at 140° C. is an elastomer with a Durometer A hardness of 92.

EXAMPLE 9

The following mixture is mixed and heated for 2 hours at 100° C. under a nitrogen atmosphere.

| | Grams | Mole |
|---|---|---|
| Polytetramethylene ether glycol (M.W. 978) | 97.8 | 0.1 |
| Glycidol | 51.75 | 0.7 |
| Tolylene diisocyanate (same mixture as in Ex. 1) | 139.2 | 0.8 |

The resulting prepolymer is degassed under vacuum, and a sample is cured in an air oven heated to 125° C. for 4 hours. A clear, hard polymeric product is obtained having the following properties:

Tensile strength at break, p.s.i. _____ 5550
Elongation at break, percent _____ 30
Durometer A hardness _____ 91

EXAMPLE 10

The following mixture is stirred under nitrogen for 3 hours at 75° C.

| | Grams | Mole |
|---|---|---|
| Polytetramethylene ether glycol (M.W. 2,000) | 200 | 0.1 |
| 1,3-butanediol | 9 | 0.1 |
| Glycidol | 14.8 | 0.2 |
| Tolylene diisocyanate (same mixture as in Ex. 1) | 69.6 | 0.4 |

To an 80-gram sample of the resulting prepolymer is added 0.1 ml. of a 10% solution of pyridine in benzene. The mixture is degassed under vacuum and cured in an air oven at 100° C. for two hours. The resulting elastomeric product has the following properties:

Tensile strength at break, p.s.i. _____ 1280
Elongation at break, percent _____ 360

EXAMPLE 11

The following materials are stirred under nitrogen and heated at 80° C. for 3 hours.

| | Grams | Mole |
|---|---|---|
| Polypropylene glycol (M.W. 1,024) | 102.4 | 0.1 |
| 1,4-butanediol | 9.0 | 0.1 |
| Glycidol | 4.4 | 0.06 |
| Tolylene diisocyanate (same as in Ex. 1) | 45.2 | 0.26 |

The reaction mixture is degassed under vacuum, and a portion is poured into a mold coated with polytetrafluoroethylene and cured overnight at 140° C. The cured material has the following properties:

Elongation at break, percent _____ 340
Tensile strength at break, p.s.i. _____ 960
Durometer A hardness _____ 56

As is apparent from these examples, the novel prepolymers of this invention are curable, by the mere application of heat, to cast polyurethanes having good physical properties and also form excellent adhesives for metal strips. The cast polyurethanes are substantially free of troublesome bubbles.

What is claimed is:

1. A heat-curable polyurethane prepolymer prepared by reacting:

(A) about one equivalent of a polyol having a molecular weight up to about 10,000,
(B) about 1.2–12 equivalents of an organic polyisocyanate, and
(C) sufficient equivalents of a 2,3-epoxyalcohol of the formula

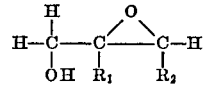

wherein $R_1$ and $R_2$ are independently $C_1$-$C_4$ alkyl or hydrogen, to react with approximately one-half of the excess isocyanato groups provided by polyisocyanate (B) over the hydroxy groups provided by polyol (A).

2. The composition of claim 1 wherein the 2,3-epoxyalcohol is glycidol.

3. The composition of claim 1 wherein from about 25–75 mole percent of the polyol used is a polyalkyleneether polyol having a molecular weight between about 350 and 3000.

4. The composition of claim 1 wherein the polyol component is a mixture of at least one high molecular weight polyol having a molecular weight greater than about 350 and up to about 75 mole percent based on the total moles of polyol present of a low molecular weight polyol having a molecular weight below about 350.

5. The composition of claim 4 wherein the high molecular weight polyol is a polytetramethyleneether polyol and the low molecular weight polyol is at least one of trimethylolpropane or 1,3-butanediol.

6. The composition of claim 1 wherein the isocyanate is an aromatic polyisocyanate.

7. The composition of claim 6 wherein the isocyanate is at least one of 2,4-tolylene diisocyanate, 2,6-tolylene diisocyanate or 4,4'-methylenebis(phenyl isocyanate) .

8. The composition of claim 1 wherein the polyol component is a mixture of polytetramethyleneether glycol and up to about 75 mole percent of a polyol having a molecular weight below about 350, the isocyanate component is a mixture of isocyanates containing from about 65–80% 2,4-tolylene diisocyanate and about 35–20% 2,6-tolylene diisocyanate, and the 2,3-epoxyalcohol is glycidol.

9. The cured polyurethane composition resulting from heating the prepolymer of claim 1 until it is cured.

10. The cured polyurethane composition resulting from heating the prepolymer of claim 8 until it is cured.

11. The composition of claim 1 wherein the heat-curable polyurethane prepolymer is prepared by reacting the polyol, organic polyisocyanate, and 2,3-epoxyalcohol at a temperature of from about 70° C.–90° C.

12. A composition of claim 1 wherein the organic polyisocyanate (B) is employed in the amount of about 1.5–8 equivalents per equivalent of polyol (A).

References Cited
UNITED STATES PATENTS 2,977,369   3/1961   Dixon.
3,445,436   5/1969   Lake et al. _____ 260—75
2,830,038   4/1958   Pattison.

OTHER REFERENCES

Iwakura et al.: Journal of Organic Chemistry, vol. 24, December 1959, pp. 1992–1994.

DONALD E. CZAJA, Primary Examiner
H. S. COCKERAM, Assistant Examiner

U.S. Cl. X.R.
260—75 NP, 77.5 AM